United States Patent [19]

Nesseth et al.

[11] 4,293,282
[45] Oct. 6, 1981

[54] MANURE HANDLING SYSTEM HAVING RECIRCULATING PUMP

[75] Inventors: Clinton A. Nesseth; Clifford B. Nesseth, both of Barron, Wis.

[73] Assignee: Nesseth, Inc., Barron, Wis.

[21] Appl. No.: 34,169

[22] Filed: Apr. 27, 1979

[51] Int. Cl.³ .............................................. F04B 39/00
[52] U.S. Cl. .................................. 417/53; 417/551; 417/430
[58] Field of Search ............... 417/565, 430, 440, 441, 417/305, 53, 431; 137/527.8

[56] References Cited

U.S. PATENT DOCUMENTS

| | | | |
|---|---|---|---|
| 1,246,543 | 11/1917 | Carmichael | 417/53 |
| 1,823,394 | 9/1931 | Geiger | 251/326 |
| 3,465,685 | 9/1969 | Sherrod | 198/675 |
| 3,687,311 | 8/1972 | Nesseth | 417/559 |
| 3,726,308 | 4/1973 | Eberhardt | 137/527.8 |
| 3,819,303 | 6/1974 | Pfleger | 417/440 |
| 3,872,981 | 3/1975 | Hedlund | 417/551 |
| 4,173,430 | 11/1979 | Kubota | 417/900 |

*Primary Examiner*—William L. Freeh
*Attorney, Agent, or Firm*—Merchant, Gould, Smith, Edell, Welter & Schmidt

[57] ABSTRACT

A manure pump 2 includes a collection hopper 4 for collecting manure. A housing 20 attached to the collection hopper 4 has a pump cylinder 32 located therein. The discharge end 38 of the pump cylinder 32 has a one-way check valve 40. Housing 20 also includes a return path 60 which connects the discharge end 38 of pump cylinder 32 to collection hopper 4. When check valve 40 is jammed in a partially open position, the return path 60 is opened by removing a valve plate 68. Operation of pump piston 32 will recirculate the manure through the return path 60 back to the collection hopper 4 to clear the jammed check valve 40.

12 Claims, 4 Drawing Figures

MANURE HANDLING SYSTEM HAVING RECIRCULATING PUMP

TECHNICAL FIELD

This invention relates in general to a manure handling system for the transfer and storage of manure in a suitable storage location. More particularly, this invention relates to such a system which incorporates a push type piston operable in a pump cylinder connected to a manure collection hopper.

DESCRIPTION OF THE PRIOR ART

Animal manure has long been used as fertilizer on farms. However, to efficiently use manure for this purpose, it must first be collected together into an appreciable quantity and then transported to the desired point of use where it is spread. A good source of animal manure in the barns or other animal enclosures in which animals are regularly contained. This is especially true of feedlot operations in which large numbers of animals are contained inside a small enclosure when they are fed a high protein diet to more quickly fatten them for slaughter. Even if the manure generated by these animals is not meant to be used as fertilizer, it must eventually be removed from the barn or animal enclosure simply for sanitary reasons. Thus, manure collection, transportation and storage has posed a difficult problem for many years.

Historically, one method of removing manure from barns of other animal enclosures was simply to shovel the manure by hand into suitable wagons or the like. The manure could then be transported to a desired location and dumped for immediate use or stored for later use. However, such a method of manure handling is heavily labor intensive. When labor is relatively expensive, as it is now, such a method is uneconomical. This method is also relatively time-consuming.

Other types of more capital intensive manure handling systems have been proposed. For example, in certain barns a continuous or intermittent source of water is arranged to flow across the barn floor and into a gutter. This water flow cleans the barn and removes the animal wastes which have dropped onto the floor. However, such a system often requires large amounts of water for its proper operation. Water is not always available for this use or it may be expensive in certain areas where drought has stricken or irrigation is normally used due to insufficient yearly rainfall. In addition, the water which has been mixed with the wastes may itself present a disposal problem. This contaminated water cannot be commingled with other flowing water streams for removal due to environmental restraints and pollution laws.

A system which has increasingly come into use for manure handling utilizes a mechanical pump for moving manure from one location to another. A collection hopper, located beneath the floor of the barn, receives and collects the animal droppings. This hopper has a pump cylinder connected to its lower end. The pump cylinder includes a check valve at its discharge end for allowing manure to flow out of, but not into, the pump cylinder. A piston having an open rear end and a check valve adjacent the front of the piston is contained inside the pump cylinder. The piston pumps manure held in the collection hopper down into and through the cylinder with the piston opening the cylinder check valve on its power stroke. U.S. Pat. No. 3,687,311, issued to one of the co-inventors of the present invention, illustrates a typical manure handling system of this type.

While mechanical manure handling systems are efficient and economical, some problems are, nonetheless, associated with their use. Proper operation of the system requires that the check valve at the bottom of the pump cylinder operate properly. In other words, the check valve must open during the power stroke of the piston, but close on the back stroke to prevent a backflow of manure into the pump cylinder. It sometimes happens that various foreign materials in the manure will cause the check valve to become jammed in a partially open piston. These materials include corn cobs or any other materials which can become wedged between the side walls of the pump cylinder and the check valve.

The jamming of the cylinder check valve in an open position represents a disadvantage for two reasons. For one thing, the piston will be ineffective to properly pump the manure if the check valve is held in an open position and backflow of the manure occurs through the pump cylinder. Secondly, it is extremely difficult to clear or unjam the cylinder check valve. Keeping in mind that the typical collection hopper and pump cylinder in this type of a system are often disposed a number of feet, e.g. 6–12 feet, beneath ground level, much of the manure contained in the collection hopper and pump cylinder must be shoveled out in an attempt to reach the pump cylinder and clear the check valve. Many cubic feet of manure must usually be removed. This is, to say the least, not a pleasant or desirable job. Furthermore, it often takes and appreciable amount of time to reach and clear a jammed check valve during which time the manure handling system must be shut down. This down-time is disadvantageous.

SUMMARY OF THE INVENTION

This invention relates to a manure handling system having a push type pump which recirculates manure from the pump cylinder back to the collection hopper to clear a jammed check valve to obviate the disadvantages of the prior art manure handling systems.

A manure handling system of this invention includes a manure collection hopper. A pump cylinder is connected to the collection hopper. The pump cylinder has a discharge end and a check valve for allowing one way movement of manure from the discharge end of the cylinder into a manure transfer line. In addition, the system includes pumping means for pumping the manure contained in the collection hopper into and through the pump cylinder. This invention relates to a selectively operable means for causing a reverse flow of manure around the discharge end of the pump cylinder. This reverse flow causing means may be operated whenever the check valve is jammed in an open position to allow the reverse manure flow to clear the jammed check valve.

BRIEF DESCRIPTION OF THE DRAWINGS

This invention will be described hereafter in the following Detailed Description, when taken in conjunction with the following drawings, in which like reference numerals refer to like elements throughout.

DETAILED DESCRIPTION

Figures 1, 2:
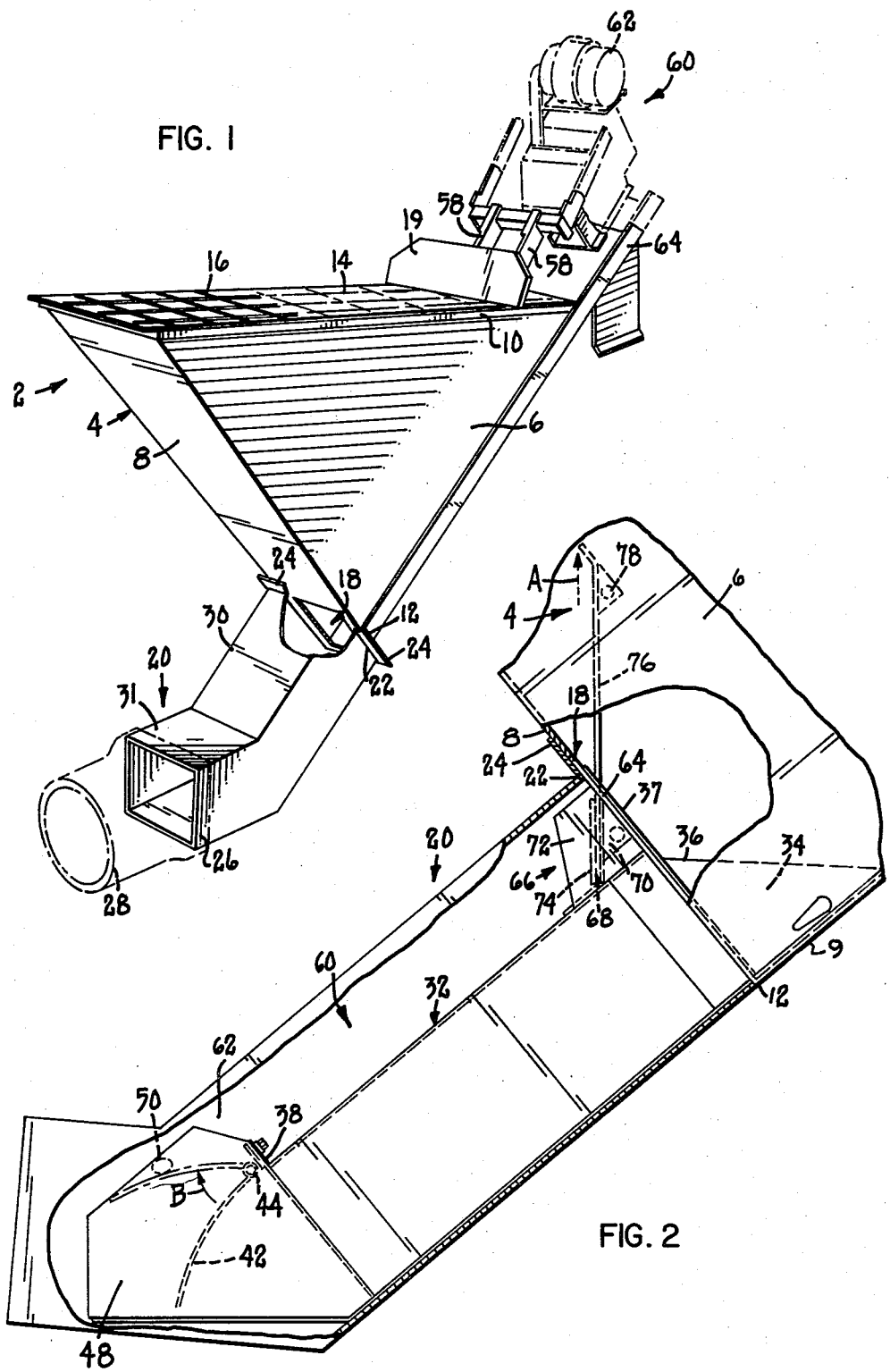
FIG. 1 is a perspective view of an improved recirculating manure pump according to this invention shown partially connected to a manure transfer line of a manure handling system.
FIG. 2 is a partial side elevational view, with the outer housing being partially broken away to show the pump cylinder of the improved recirculating manure pump of this invention.
Figure 3:
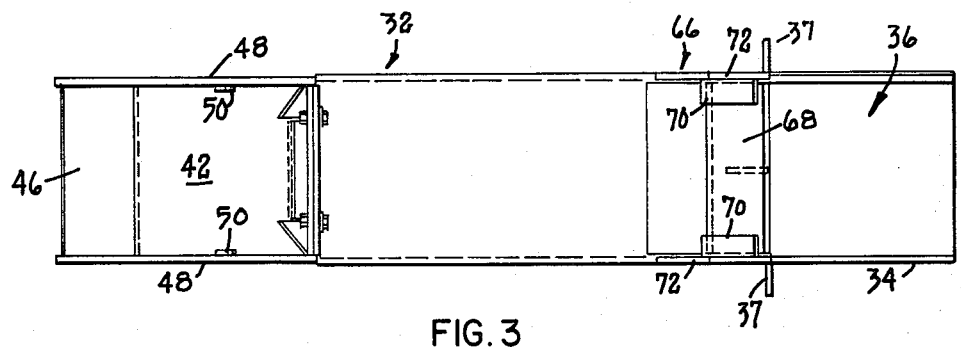
FIG. 3 is a top plan view of the improved recirculating manure pump shown in FIG. 2, particularly illustrating the pump cylinder.
Figure 4:
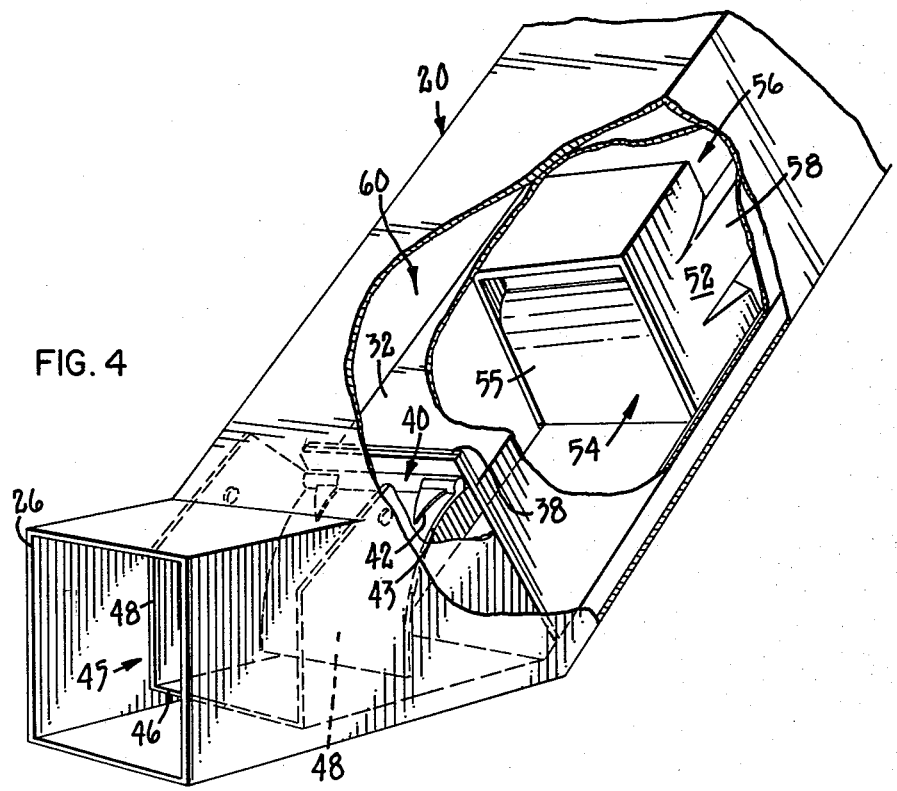
FIG. 4 is a perspective view of the housing portion of the improved recirculating manure pump of this invention, with portions of the housing and pump cylinder of the pump being broken away to illustrate the pump piston.

Referring first to FIG. 1, an improved manure pump for use in a manure handling system is generally indicated as 2. Pump 2 is designed for use in any conventional manure handling system which utilizes a piston type pump to transfer manure, usually animal manure, from one location to another location. One manure handling system in which pump 2 could be used is disclosed in U.S. Pat. No. 3,687,311 issued to Clinton A. Nesseth on Aug. 29, 1972. The teachings of this patent with regard to the over-all details of such a system are incorporated herein by reference. While this patent may be referred to for a complete description of the system, the system will be described in conjunction with pump 2 insofar as is necessary to an understanding of the present invention.

The manure handling system of this invention incorporates a manure collection hopper which is typically located in any suitable location so as to receive and collect animal manure from the floors of a barn or other animal enclosure. A pump cylinder, which usually slopes in a downward direction, is attached to the collection hopper and has a reciprocal pump piston contained therein. The pump piston is usually constructed to allow manure to flow through the pump piston on the backstroke of the piston, but to push the manure through the pump cylinder on the powerstroke of the piston. The discharge end of the pump cylinder includes a check valve for allowing only one way movement of the manure from the pump cylinder into a manure transfer line connected to the discharge end of the cylinder.

Manure pump 2 is the first piston type pump used in such a system in which the pump cylinder includes an access opening, other than the cylinder itself, for allowing an operator to reach the check valve on the discharge end of the pump cylinder from a point inside the collection hopper. This access opening also forms part of a means for recirculating the manure from the collection hopper, through the pump cylinder and back to the collection hopper. Thus, manure pump 2 will be referred to hereafter as a recirculating pump.

Recirculating pump 2 includes a manure collection hopper generally indicated as 4. Hopper 4 is that hopper or portion thereof, referred to previously, which is part of a typical manure handling system. Collection hopper 4 includes two, laterally spaced triangular side walls 6 only one of which is shown in FIG. 1. Side walls 6 are integrally joined together by downwardly sloping rectangular front and rear walls 8 and 9. Collection hopper 4 thus is triangularly shaped and inverted having a relatively large upper end 10 and a tapering body which leads to an apex 12. While collection hopper 4 has been shown as shaped triangularly, any other suitable shapes, e.g. pyramidal, could be used.

The upper end 10 of collection hopper 4 is open to allow the hopper to receive and collect animal manure. However, a perforated cover or grate 14 is preferably placed over the open upper end 10 of the collection hopper 4. The perforations 16 in grate 14 are sized to allow manure or other similar flowable luiqid or semi-liquid materials to pass therethrough, but to retain any relatively large chunks of extraneous matter which may be contained in the manure. The grate 14 includes a slanted, upwardly extending flange or baffle 19 at one end thereof. The purpose of baffle 19 will be described hereinafter.

Collection hopper 4 may be made in different sizes, e.g. usually in either a long or short hopper version. Preferably, when used in a manure handling system of the type referred to above, collection hopper 4 will be mounted below ground level with its open upper end 10 being located close to or at ground level. Animal manure, which is lying on the floor of the barn, can then be scraped, using a tractor of backblade or the like, onto a conveyor which carries the manure to recirculating pump 2 and dispenses the manure into the upper end 10 of hopper 4. Hopper 4 can be buried at any desired depth even one where the open upper end 10 is located a number of feet, e.g. 6–12 feet, below ground level. In this latter type of construction, which is typical of a short hopper model, the hopper will generally be continued upwardly to ground level by means of a poured concrete hopper extension. This concrete hopper extension simply serves to continue the walls 6, 8 and 9 of the hopper 4 upwardly to a point closely adjacent the ground. The perforated grate 14 is then usually located on the top of the concrete hopper extension.

Collection hopper 4 includes a substantially rectangular opening 18 in front wall 8 generally adjacent apex 12 and extending upwardly a suitable distance therefrom. A hollow housing, generally indicated as 20, is fixedly connected to the lower end of collection hopper 4. Housing 20 has an open upper end 22 which communicates with opening 18 to fluidically connect hopper 4 with housing 20. A plurality of mounting flanges or brackets 24 on the upper end 22 of housing 20 are used to attach, as by welding or bolting, the housing 20 to the front wall 8 of collection hopper 4. In addition, housing 20 includes an open lower end 26 which is located distally from collection hopper 4.

The lower or discharge end 26 of housing 20 is preferably coupled to a manure transfer line generally indicated as 28. Manure transfer line 28, which forms part of the manure handling system, leads from housing 20 to any suitable storage location into which the manure is to be conducted and stored. This storage location often has the form of a trapezoidally shaped pit. Any suitable materials or cross-sectional shapes may be selected for manure transfer line 28. Preferably, manure transfer line 28 comprises circularly shaped PVC pipe.

Housing 20 has a rectangular cross-section and includes a downwardly extending upper section 30 and a substantially horizontal lower section 31. The angle between the upper and lower sections 30 and 31 is selected so that the lower section 31 will be approxiamtely horizontal or parallel to ground level. In other words, the manure transfer line 28 coupled to the lower or discharge end 26 of housing 20 will extend approximately parallel to ground level. Housing 20 could have other than rectangular cross-sectional shapes.

A pump cylinder, generally indicated as 32, is removably located inside the upper section 30 of housing 20.

Pump cylinder 32 is formed as a hollow, substantially square and elongated box which is merely slid down into housing 20. Pump cylinder 32 has an open upper inlet end 34 which extends through opening 18 into the lower end of collection hopper 4. Inlet end 34 is angularly oriented or cut away relative to cylinder 32 such that it defines an open mouth 36 for the cylinder which mouth is horizontal inside hopper 4 when cylinder 32 is contained inside housing 20. Pump cylinder 32 includes two elongated flanges 37 which extend outwardly from and are fixed to each side wall of the pump cylinder 32 adjacent the inlet end 34. These flanges 37 engage against the front wall 8 of hopper 2 around the sides of opening 18 to hold and retain pump cylinder 32. Flanges 37 will prevent that cylinder from further sliding downwardly in housing 20 any further than is shown in FIG. 2. In addition, pump cylinder 32 includes a discharge end 38 which is located approximately at the junction between the sloping upper section 30 and the substantially lower section 31 of housing 20 when pump cylinder 32 is placed inside housing 20. As shown in FIG. 2, discharge end 38 of pump cylinder 32 is longitudinally spaced in back of the discharge end 26 of housing 20 for a purpose to be described hereafter.

Discharge end 38 of pump cylinder 32 includes a one-way check valve generally indicated as 40. Check valve 40 is designed to open to allow manure to move from the pump cylinder 32 into the outer end of housing 20, but closes when any reverse movement of manure is attempted. Various types of conventional check valves could be used. Preferably, check valve 40 comprises a flap type valve in which an elongated flap 42 is pivotably mounted on a horizontal axis 44 to the discharge end 38 of pump cylinder 32. Preferably, flap 42 is curved or otherwise formed with a non-linear orientation.

Pump cylinder 32 includes a U-shaped open saddle 45 fixedly connected and surrounding discharge end 38. Saddle 45 includes a bottom wall 46 and two spaced, vertically extending side walls 48. Side walls 48 may have any suitable configuration, but they are preferably closely positioned adjacent the lateral edges 43 of flap 42. The purpose of side walls 48 is to minimize the gap occurring between the lateral edges 43 of flap 42 and the side walls of the housing 20 to prevent foreign matter from building up and wedging the flap 42 in an open position. In addition, side plates 48 of saddle 44 include stops 50 which protrude inwardly therefrom into the path of movement of flap 42. Stops 50 will engage against the flap 42 when that flap is in its phantom line position in FIG. 2 to limit the outward angular movement of flap 42 in its open position.

Any conventional pump means may be included inside pump cylinder 32 for pumping manure therethrough. One preferred form of pump means is a square pump piston 52 having a swingable check valve or flap type gate 54 defining the front wall thereof. Check valve 54 is similar to check valve 40 except that the flap 55 of check valve 54 is linear rather than curved. Piston 52 is formed as an enclosed body except that the rear end 56 of piston 52 is open to allow manure to pass through piston 52. Pump piston 52 has been shown as having a square cross-section so that it is closely received inside square pump cylinder 32. However, pump piston 52 and pump cylinder 32 may have any suitable cross-sectional configuration such as a circular configuration.

Pump piston 52 has two longitudinally extending connecting rods 58 secured to opposed side walls of piston 52. Connecting rods 58 extend upwardly through pump cylinder 32 and collection hopper 4 to a drive means 60. Drive means 60 includes a suitable drive motor 62, e.g. a hydraulic, electric or internal combustion motor, mounted on the top of hopper 4 by mounting arms 64. Upon operation of drive motor 62, the connecting rods 58 are reciprocated back and forth inside pump cylinder 32 in a longitudinal direction by virtue of an eccentric which connects drive motor 62 and rods 58. Drive means 60 as disclosed herein is of the type disclosed in the U.S. patent referred to previously. However, any suitable driving arrangement may be used for reciprocating connecting rods 58.

As pump piston 52 is reciprocated inside pump cylinder 32, it serves to pump manure from inside the collection hopper 4 down through the pump cylinder 32, through the lower section 31 of housing 20 and into manure transfer line 28. During the power stroke of piston 52 (i.e., the downward stroke), check valve 54 is in a closed position. Thus, piston 52 is effective to push any manure held inside the pump cylinder 32 in front of the piston 52 downwardly through cylinder 32 and out through check valve 40. During the power stroke of piston 52, check valve 40 opens to allow the manure to flow from the pump cylinder 32 and housing 20 into manure transfer line 28. On the return or upstroke of pump piston 52, check valve 54 swings open by virtue of the pressure of the manure contained in cylinder 32 and hopper 4 above the piston 52. This manure acts on check valve 54 since the rear end 56 of piston 52 is open. The open check valve 54 allows additional manure from the collection hopper 4 to flow down through the piston 52 on its upstroke to reload the pump cylinder 32 prior to the next power stroke of piston 52. Piston 52 normally stays inside the pump cylinder 32 during operation of the device. However, the piston 52 could be withdrawn, at least partially, into the collection hopper 4 during the upstroke if so desired. During the upstroke of piston 52, the cylinder check valve 40 closes as described hereafter.

Cylinder check valve 40 is needed because considerable back pressure will build up in manure transfer line 28 during operation of pump 2. Manure transfer line 28 is usually connected to a pit into which the manure is pumped for storage. This pit may, in fact, be located at a higher elevation than transfer line 28. When the pit is filled with manure and the manure transfer line 28 is also substantially filled, considerable back pressure will be exerted through line 28. Without the check valve 40, which closes during the upstroke of piston 52, this back pressure would cause manure to back flow into pump cylinder 32. Thus, pump piston 52 would not be effective without check valve 40 to pump any manure since the manure which is pumped from cylinder 32 during the power stroke would always be returned to cylinder 32 by the back pressure during the upstroke. However, check valve 40 prevents this back flow from occurring.

The side plates 48 in the saddle 45 are also helpful in preventing check valve 40 from becoming jammed. They closely circumscribe the movement of check valve 40 to help minimize the gap around the edges 43 of flap 42 to prevent foreign matter from jamming against the check valve 40. While side plates 48 help minimize jamming of the check valve 40, it sometimes occurs that various foreign matter still nonetheless becomes wedged between the edges of flap 42 and the side plates 48. Foreign matter which causes this to happen includes corn cobs and the like which work their way down and into the check valve 40 for jamming the check valve 40 in a partially open position. Whenever the check valve is jammed in this partially open position, movement of the piston 52 is no longer effective to pump any manure whenever considerable back pressure is present in transfer line 28.

This invention particularly comprises means for allowing easy access to cylinder check valve 40 and for recirculating manure in a reverse direction back past the check valve 40 whenever check valve 40 is jammed in a partially open position. Pump cylinder 32 does not occupy all of the cross-sectional area of housing 20. In fact, cylinder 32 is spaced from the top wall of housing 20 to define an open passageway or return path 60. Return path 60 includes an inlet end 62 located above and adjacent the discharge end 38 of pump cylinder 32. In addition, return path 60 includes an outlet end 64 in the front wall of collection hopper 8. Preferably, the outlet end comprises that portion of the rectangular opening 18 which is not filled by the pump cylinder 32. Return path 60 thus forms a part of the means for recirculating the manure from the discharge end 38 of pump cylinder 32 back to collection hopper 4.

Return path 60 includes a selectively operable slide valve, generally indicated as 66, located at its outlet end 64 into collection hopper 4. Slide valve 66 comprises a valve plate 68 which is adapted to close return path 60. Valve plate 68 slides between and is guided by any suitable support members. Referring to FIG. 2, these support members preferably include a triangular shaped grommet 70 located at each side of the return path (only one grommet 70 is shown in FIG. 2) on a mounting flange or bracket 72 which is welded on each side of the return path to the top wall of pump cylinder 32. In addition, a confining plate 74 also carried on each mounting bracket 72 is spaced from the corresponding grommet 70 to define a passageway which receives the valve plate 68 therein. Valve plate 68 is shown in FIG. 2 in a closed position at which it is effective to block return path 60.

Valve plate 68 includes an elongated actuating rod 76 which extends upwardly therefrom inside of collection hopper 4. Actuating rod 76 has an upper end which includes a hook eye 78 for coupling the actuating rod 76 to the hook of a boom, winch or the like. Whenever actuating rod 76 is moved vertically upward in the direction of arrow A, valve plate 68 is slid out of its supporting structure to selectively open return path 60.

Preferably, the grommets 70 and plates 74 are oriented so that the valve plate 68 extends approximately vertically into collection hopper 4. While such upward movement of the actuating rod 76 can be achieved by lifting equipment hooked into the hook guide 78, it is also possible for the user of pump 2 to climb down into hopper 4 and manually lift rod 76. It will usually be necessary when reinserting the valve plate 68 into its supporting structure to close off return path 60 to have someone go down into hopper 4 to guide valve plate 68 into place.

Recirculating pump 2 is usually operated in a manure handling system to pump manure held in the collection hopper 4 into the manure transfer line 28. During a normal pumping operation, the valve plate is located in a closed position to block return path 60. Return path 60 would normally become filled with manure due to normal back pressure in manure transfer line 28. However, this filling of return path 60 is normal and will not impede operation of the pump piston 52.

Assume that a condition is reached during operation of the pump 2 in which considerable back pressure exists in transfer line 28 and check valve 40 has become jammed in an open position. Jamming of the check valve 40 occurs not only because material might wedge against the lateral edges 43 of flap 42, but because the manure itself might become tightly packed around the top and edges of flap 42. When this occurs, actuating rod 76 is pulled upwardly to remove valve plate 68 from the outlet end 64 of return path 60. This opens an access opening in the collection hopper 4 which is defined by the outlet end 64 of the return path 60. When check valve 40 is jammed in a fully open position as shown in FIG. 2, the operator can enter collection hopper 4. This operator can then extend a long tool (not shown), e.g. a bar or rod, through outlet end 64 to bang the tool against check valve 40 in an attempt to clear the check valve. Even if the tool is not effective to clear the check valve 40, the banging of the tool against the check valve will usually at least partially loosen the check valve.

If the operator is not able to unjam check valve 40 with the tool, of if the flap 42 is not jammed in a fully open position such that the tool does not reach the valve 40, then pump 2 is operated in a recirculating mode. In this mode, the outlet end 64 of return path 60 is left open so that the return path now communicates between the discharge end 38 of pump cylinder 32 and collection hopper 4. Pump piston 52 is then energized by drive means 60 in a reciprocating mode as it would normally be operated while pumping manure. However, because considerable back pressure exists in transfer line 28, the manure being pumped by the pump piston 52 does not flow into line 28 but instead takes the course of least resistance, i.e. the return path 60. Thus, as pump piston 52 operates, manure flows down to the discharge end 38 of pump cylinder 32 and then back in a reverse flow indicated by arrows B. This reverse flow continues up through return path 60 and empties back into collection hopper 4. Return path 60 thus provides, in conjunction with the operation of pump piston 52, a means for recirculating manure from the collection hopper 4 through the pump cylinder 32 and back to collection hopper 4. The reverse flow B of manure around the discharge end 38 of pump cylinder 32, will eventually tend to remove whatever obstruction is jamming the check valve 40 in an open position. As soon as this obstruction is removed, check valve 40 will close normally. Upon then reinserting valve plate 68 to close return path 60, continued operation of pump piston 52 will resume pumping the manure from collection hopper 4 through the transfer line 28.

This invention is advantageous because it provides a means for easily and quickly unjamming the check valve 40 which is not typical of any of the manure pumps of the prior art. It obviates the necessity in prior art devices of shoveling one's way all the way through collection hopper 4 and down through pump cylinder 32 to reach and dismantle the cylinder check valve 40. In prior art devices, piston 52 must be removed and disassembled from pump cylinder 32 before the operator can even reach check valve 40 to unjam it. This disassembly and the consequent reassembly of the pump piston 52 has meant that it usually takes a number of hours, e.g. three hours, to reach and clear a jammed check valve in the prior art. With the present invention, the return path 60 can be opened and the check valve 40 cleared within five to fifteen minutes. This substantial savings of time is, of course, advantageous to the farmer.

Various modifications of this invention will be apparent to those skilled in the art. For example, it is preferred that the outlet end 64 of return path 60 be connected to the collection hopper 4 to recirculate the manure back to the hopper during the recirculating mode of operation. However, this is not strictly necessary since it is the reverse flow of manure around check valve 40 which serves to clear the check valve. Such a reverse flow could be provided even if return path 60 were not connected back to hopper 4 but instead led away to another location. Any other suitable means for causing a reverse manure flow around the check valve 40 could also be used. In addition, the components of recirculating pump 2 are formed of suitable materials such as steel or other high-strength materials. However, any appropriate materials could be used for the components of recirculating pump 2. Thus, the scope of this invention is to be limited only by the appended claims.

What is claimed is:

1. An improved manure handling system of the type having a manure collection hopper; a pump cylinder connected to the collection hopper, the pump cylinder having an interior, a discharge end and a check valve for allowing one way movement of manure from the discharge end of the cylinder into a manure transfer line; and means for pumping the manure contained in the collection hopper into and through the pump cylinder; and wherein the improvement comprises: selectively operable means for simultaneously causing a flow of manure through the interior of the pump cylinder, around the discharge end of the pump cylinder, and back along the exterior of the pump cylinder in a reverse direction, said means being actuable whenever the check valve is jammed in an open position to allow the reverse manure flow to clear the jammed check valve.

2. An improved manure handling system as recited in claim 1, in which the pump cylinder slopes downwardly to the manure collection hopper.

3. An improved manure handling system as recited in claim 1, in which the reverse flow causing means comprises means for recirculating manure from the discharge end of the pump cylinder back to the collection hopper.

4. An improved manure handling system as recited in claim 3, in which the recirculating means comprises:
    (a) a normally closed return path located adjacent the pump cylinder which return path has an inlet end located adjacent the discharge end of the pump cylinder and an outlet end located in the collection hopper; and
    (b) selectively operable valve means located in the return path for opening the outlet end of the return path, which valve means are suited to be opened in conjunction with operation of the pumping means to cause manure to flow from the discharge end of the pump cylinder, back through the return path, and into the collection hopper.

5. An improved manure handling system as recited in claim 4, in which the valve means comprises a slidable valve plate mounted in the return path.

6. A manure handling system as recited in claim 4, in which the outlet end of the return path is located immediately adjacent to an inlet end of the pump cylinder.

7. An improved manure handling system as recited in claim 4, in which the valve means includes an upwardly directed actuating rod that extends to a point closely adjacent the top of the collection hopper for allowing easy actuation of the valve means.

8. An improved manure handling system as recited in claim 7, in which the actuating rod of the valve means extends inside the collection hopper.

9. An improved manure handling system as recited in claim 4, in which an outer hollow housing surrounds the pump cylinder and extends beyond the discharge end of the pump cylinder for having an outer end of the housing connected to the manure transfer line, and wherein the return path is defined by that portion of the housing not occupied by the pump cylinder.

10. An improved manure handling system as recited in claim 9, in which the check valve comprises a pivotably mounted flap valve which rotates about a substantially horizontal axis, and wherein the housing includes two side plates located adjacent each side of the flap valve for minimizing the opening between the flap valve and the housing to prevent foreign matter from falling therein and jamming the check valve.

11. An improved manure handling system for transfering manure from a collection point to a storage location, which comprises:
    (a) a collection hopper mounted at the collection point for receiving and collecting manure, the collection hopper being mounted below ground level;
    (b) a manure transfer line for conducting manure to the storage location;
    (c) a hollow housing for operatively connecting the manure transfer line to the collection hopper, wherein the housing includes a substantially enclosed pump cylinder having a discharge end which is longitudinally spaced from the end of the housing connected to the transfer line, wherein the discharge end of the pump cylinder includes a check valve for allowing only egress of manure from the pump cylinder; and wherein the remainder of the housing not occupied by the pump cylinder defines a return path having an outlet end which is selectively openable in the collection hopper; and
    (d) pump means arranged inside the pump cylinder for normally pumping manure from the collection hopper, through the pump cylinder and into the manure transfer line in a first direction, and means for opening the outlet end of the return path whenever the check valve is jammed in an open position such that continued operation of the pump cylinder causes the manure to flow in a reverse direction from the discharge end of the pump cylinder back through the return path and into the collection hopper, whereby the reverse manure flow clears the jammed check valve.

12. A method for handling manure, which comprises:
    (a) collecting manure in a collection hopper;
    (b) pumping the manure in the collection hopper through a pump cylinder connected to the collection hopper and into a manure transfer line;
    (c) providing a normally closed returned path adjacent the pump cylinder which return path leads back to the collection hopper; and
    (d) opening the return path while simultaneously continuing to pump the manure from the collection hopper through the pump cylinder against the pressure of manure already contained in the transfer line, such that the manure pumped from the pump cylinder recirculates back to the collection hopper through the return pass.

* * * * *